May 10, 1938.   J. W. McNAIRY   2,117,196
PROTECTIVE SYSTEM
Filed Aug. 20, 1937
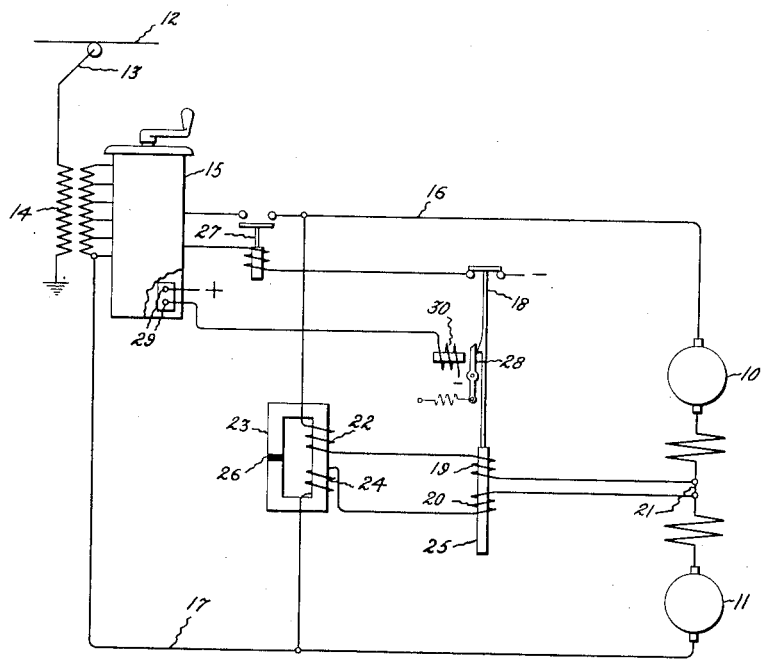
Inventor:
Jacob W. McNairy,
by Harry E. Dunham
His Attorney.

Patented May 10, 1938

2,117,196

UNITED STATES PATENT OFFICE 2,117,196

PROTECTIVE SYSTEM

Jacob W. McNairy, Erie, Pa., assignor to General Electric Company, a corporation of New York Application August 20, 1937, Serial No. 160,102

4 Claims. (Cl. 172—179)

My invention relates to protective systems for electric motors, more particularly to systems for protecting a plurality of electric traction motors against wheel slippage and has for its object a simple and reliable protective system of this type.

In the operation of a plurality of electric motors separately connected to the driving axles of a vehicle one pair of wheels connected to an axle sometimes slips on the track, especially when rapid acceleration is attempted under heavy load conditions. When this slipping occurs the motor or motors connected to the slipping axle accelerate to a higher speed than the other motors and may reach a speed causing damage to the motor on account of the resulting high mechanical stresses and flashover at the commutator.

In carrying out my invention I provide protective means in which the effect of a difference in the voltages of the motor is increased whereby the relay is very sensitive. The device furthermore is arranged to operate and disconnect the motor in the event that it becomes partially disabled. Thus an indication is given of this condition of the protective equipment so that it may be repaired and be ready to function to protect the motor in the event of wheel slippage.

In one form of my invention I provide a reactance, functioning as an autotransformer, which is connected across the motor circuit, its winding being divided into two sections in circuit with which are connected two relay coils acting in opposition to each other. The midpoint between the relay coils is connected to the midpoint between the motors. With this arrangement a double differential effect is obtained by reason of the mutually inductive relation of the two sections of the winding whereby the sensitivity of the device is increased, while if one or the other of the relay coil circuits is disabled the relay is operated immediately by the other coil.

For a more complete understanding of my invention reference should be had to the accompanying drawing a single figure of which is a diagrammatic representation of my invention as applied to an electrically operated vehicle such as an electric locomotive.

Referring to the drawing, I have shown my invention in one form as applied to series connected motors 10 and 11 of the single-phase commutator type. The motors are energized from a trolley wire 12, supplied with single-phase alternating current, energy being taken off through a trolley 13 and a transformer 14. By means of a suitable manually operated controller 15, which may be a drum controller, the supply conductor 16 leading to one side of the motor circuit is connected to a selected tap of suitable voltage on the secondary winding of the transformer 14 so as to control the speed of the motors, the other side of the motor circuit being connected through a supply conductor 17 to one side of the transformer secondary winding.

For the protection of the motors against wheel slippage I have provided a relay switch 18 which is normally closed and which is operated upon the occurrence of wheel slippage by the differential effect of the two coils 19 and 20. These two coils are connected so as to be responsive respectively to the voltages of its two motors by connection across similar portions of the motor circuits, or as shown across the armature of the two motors. Each coil has one terminal connected to the point 21 between the motor armatures. The other terminal of the coil 19 leads through a winding 22 on a magnet core 23 and thence to the conductor 16. In a similar manner the other terminal of the coil 20 leads through the winding 24 on the core 23 to the conductor 17. The two windings 22 and 24 are in mutually inductive relation with each other.

The two coils 19 and 20 are electrically connected so that under normal operating conditions the two coils oppose and neutralize each other. Preferably they are of identical construction having the same number of turns and therefore exactly neutralize each other under normal balance motor voltage conditions so that no lifting force is applied to the armature 25 of the relay 18. Actually, as shown in the drawing, the coils are oppositely wound.

The magnetic core 23 and the windings 22 and 24 have proportions suitable for an auto-transformer which may be connected permanently across the motor supply circuit conductors 16 and 17, the two windings being so connected that their magnetic effects are cumulative. Moreover the two windings are identical in construction having the same number of turns. Preferably taps are provided on one or both windings for adjustment of the number of turns to correspond with any inequality in the voltage of the two motors.

Furthermore the coils 19 and 20 are in reality current coils having comparatively few turns as compared with the windings 22 and 24. Thus under normal conditions there is very little voltage drop across the coils 19 and 20 and the current that flows through them is the exciting current for the windings 22 and 24. In order to increase this exciting current somewhat the core 23 may be provided with an air gap 26.

In the event of slippage of the wheels driven by one of the motors the particular relay coil 19 or 20 connected across that motor has its energization increased by the increased voltage, i. e. counter E. M. F., of the motor by reason of the increased speed of the motor this effect being substantially proportional to the increasing speed of the motor. For example, if the wheels driven by the motor 11 slip, the speed of the motor 11 increases and its resulting increased voltage is applied to the winding 24 and the coil 20 with resulting increase in current in this circuit. At the same time, by reason of the mutual inductive relation between the winding 24 and the winding 22, the current through the winding 22 and the coil 19 is reduced. Neglecting the energy losses in the autotransformer, the reduction in current in the coil 19 is approximately the same in amperes as the increase in the current in the coil 20. In other words, the winding 24 induces a voltage in the winding 22, which voltage reduces the current in the winding 22 and the coil 19. If the voltage of the motor 11 is increased sufficiently with respect to the voltage of the motor 10, the current in the coil 19 is reversed so that the two coils become accumulative and both act to operate the armature 25 of the relay.

It will thus be observed that the autotransformer gives increased sensitivity in that an increase in current in one relay coil is accompanied by a corresponding decrease in current in the other coil with therefore a double differential current effect available for the operation of the relay. It will be further observed that the relay coils may be constructed to give great sensitivity in their response because under normal operation with balanced currents in the coil circuits, the two coils neutralize each other, the relay therefore being unexcited.

In the event of damage to either one of the circuits of the coils 19 and 20 resulting in an open circuit in the coil or any other part of the circuit it will be observed that the other one of the two coils will immediately open the relay 18 to deenergize the motor. In fact in the event of such an open circuit the current in the remaining coil increases to about double its previous value because that coil must then carry the full excitation current for the core 23. This assures operation of the relay by the remaining coil.

When the relay opens, it is latched in the open position by a spring biased latch 28 until the controller 15 is thrown back to the off position to bridge the terminals 29 and thereby energize a magnet 30 which retracts the latch 28 and allows the relay switch 18 to close.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A protective system for electric motors connected for energization in circuit with each other, comprising a relay for controlling the circuit of said motors, a pair of operating coils for said relay, a pair of windings in inductive relation to each other, and connections connecting each of said relay coils in circuit with one of said windings across at least a portion of the circuit of one of said motors so that said windings are energized accumulatively and said relay coils in opposition to each other.

2. A protective system for electric motors connected for energization in circuit with each other, comprising a relay for controlling the circuit of said motors, a pair of operating coils for said relay, a magnet core, a pair of windings on said core, and connections connecting each of said relay coils in circuit with one of said windings across at least a portion of the circuit of one of said motors so that said windings are energized accumulatively and said relay coils in opposition to each other.

3. A protective system for an electric vehicle provided with a pair of driving axles and a pair of electric motors separately connected to drive said axles, said motors being electrically connected for energization in circuit with each other, comprising a relay for controlling the circuit of said motors, a pair of operating coils for said relay, a pair of windings in inductive relation to each other, and connections connecting each of said relay coils in circuit with one of said windings across at least a portion of the circuit of one of said motors so that said windings are energized accumulatively and said relay coils in opposition to each other in accordance with the respective voltages of said motors.

4. A protective system for an electric vehicle provided with a pair of driving axles and a pair of electric motors separately connected to drive said axles, said motors being electrically connected for energization in series with each other, comprising means for applying a variable voltage to said motors to accelerate said motors, a relay for controlling the circuit of said motors, a pair of operating coils for said relay, a magnet core, a pair of windings on said core and connections connecting each of said relay coils in a circuit with one of said core windings across one of said motors so that said windings are energized accumulatively and said relay coils in opposition to each other.

JACOB W. McNAIRY.